United States Patent [19]

Mori

[11] Patent Number: 5,506,732
[45] Date of Patent: Apr. 9, 1996

[54] OPTICAL PICKUP

[75] Inventor: Yasuto Mori, Tokyo, Japan

[73] Assignee: NEC Corporation, Japan

[21] Appl. No.: 298,933

[22] Filed: Aug. 31, 1994

[30] Foreign Application Priority Data

Aug. 31, 1993 [JP] Japan ................................ 5-237304

[51] Int. Cl.[6] ...................................................... G02B 7/02
[52] U.S. Cl. ........................................ 359/824; 359/814
[58] Field of Search ................................. 359/824, 823, 359/814, 813

[56] References Cited

U.S. PATENT DOCUMENTS

| 4,790,628 | 12/1988 | Nanno et al. | 359/824 |
| 4,863,240 | 9/1989 | Nakajima et al. | 359/824 |
| 4,998,802 | 3/1991 | Kasuga et al. | 359/814 |

FOREIGN PATENT DOCUMENTS 4-2420   1/1992   Japan .

*Primary Examiner*—Loha Ben
*Attorney, Agent, or Firm*—Ostrolenk, Faber, Gerb & Soffen

[57]  ABSTRACT

An optical pickup which prevents a variation in the maintenance of the neutral point of the objective lens, and has better vibration resistance. The optical pickup comprises a holder holding an objective lens, which is supported by a journal mounted on the outer core and is slidable in the axial direction and rotatable around the axis, a driving coil for focusing and a driving coil for tracking, both of which are mounted on the holder, a focusing magnet and a tracking magnet, both of which are mounted on an outer core and separated from it by a gap, and opposite to the magnets with the coils therebetween. A movable magnet is secured on a line extending from the objective lens on the holder to the journal. In addition, a stationary magnet is secured on the outer core opposite to the magnet, with the different poles being opposed to each other.

3 Claims, 6 Drawing Sheets

OPTICAL PICKUP

BACKGROUND OF THE INVENTION

1. Field of the Invention

This invention relates to an optical pickup such as that used in an optical disk drive and, more particularly, to a driving structure for a shaft-slidable objective lens the holder of which is slidable and rotatable and supported by a journal.

2. Description of the Prior Art

Generally, a prior art optical pickup comprises, as shown in FIGS. 7 and 8, an objective lens 1 focusing a light beam, a holder 2 holding an objective lens, a journal 3 for holding the holder 2 slidable axial direction or in the focusing direction 21 and rotatable around the axis tracking direction 22, and an outer core 5 which is a fixed member and on which the journal 3 is mounted. The journal 3 is secured at the center of the outer core 5 by press-fitting or bonding.

The objective lens 1 is held by the holder 2 at a position offset from the journal 3. The holder 2 has a balance weight 11 mounted fixedly at a position symmetrical to the objective lens 1 about the journal 3. In addition, pairs of driving coils for focusing 12 and driving coils for tracking 13 are secured on the outer periphery of the holder 2 at respectively symmetrical positions around the journal 3.

Pairs of focusing magnets 14 and tracking magnets 15 are secured on the outer core 5 at respectively symmetrical positions around the journal 3 so as to be aligned with driving coils for focusing 12 and the driving coils for tracking 13, respectively. The poles N and S of focusing magnet 14 are polarized and magnetized in the axial or focusing direction 21, while those of the tracking magnet 15 are polarized and magnetized in the tracking direction 22.

An inner core 16 is secured to outer core 5, being separated by a gap, from and substantially radially aligned with magnets 14 and 15. The gap accepts driving coil for focusing 12 and driving coil for tracking 13 between inner core 16 and the magnets. The Inner core 16, coil 12, magnet 14, and outer core 5 form a magnetic circuit in the focusing direction 21. Furthermore, inner core 16, coil 13, magnet 15, and outer core 5 form a magnetic circuit in tracking direction 22. A magnetic piece 17 is secured on outer periphery of the holder 2 opposite to the centers of the magnetic poles of focusing magnet 14 in the focusing direction 21 and the tracking direction 22.

The operation of the prior art optical pickup with such an arrangement will now be described. FIGS. 9 and 10 show the relationship between the flux from the focusing magnet 14 and the magnetic piece 17 in a plan view and a side cross sectional view, respectively. Because the focusing magnet 14 is polarized and magnetized in the focusing direction 21, in the curved plane containing the tracking direction 22 as shown in FIG. 9, a flux density of focusing magnet 14 is at a maximum at the central area in the circumferential direction in the gap, and decreases toward the ends of the gap. Because the magnetic piece 17 is placed in this gap, it is subject to a magnetic attraction from the focusing magnet 14, as well as a restoring force to stably hold the magnetic piece at the maximum point of the flux. This restoring force holds the holder 2 at neutral point in the circumferential direction, whereby the objective lens 1 is held at the neutral point in the tracking direction 22.

Furthermore, as shown in FIG. 10, in the cross section of the focusing magnet 14 in the focusing direction 21, the magnet 14 is polarized and magnetized in the focusing direction 21 so that the magnetic piece 17 acts as a part of the magnetic path, and is magnetically attracted to the polarized and magnetized central portion. This attraction acts on the magnetic piece 17 as a restoring force to hold a holder 2 at the neutral point in the axial direction, whereby the objective lens 1 is held at the neutral point in the focusing direction. Such prior art is disclosed in U.S. Pat. No. 4,998,802.

However, the above-mentioned conventional optical pickup must have a structure for polarizing and magnetizing magnet 14 to magnetically float holder 2, on which magnetic piece 17 is secured, as a means for holding objective lens 1 at the neutral point in the focusing and tracking directions. This leads to an increase in cost, and has problems such that a boundary of polarization is varied depending on magnetization accuracy, and that the boundary becomes wide, making it difficult to hold it at the desired neutral position.

In addition, because such a slide-type objective lens driving structure requires a clearance of about 10–20 μm between the bearing hole 4 provided in the holder 2 and the journal 3, it has a problem such that, if any vibration is imparted on the optical pickup, the holder 2 is jerked, which causes severe displacement of the objective lens 1, which the displacement tracking servo fails to follow, so that the vibration resistance is deteriorated. Conventionally, to eliminate this problem, for example, Japanese Utility Model Publication No. Hei 4-2420, published Jan. 28, 1992, proposes a method of pressing the holder against the journal by applying a force on the holder with a resilient support member. Alternatively, the journal is pressed in such a manner that a magnetic plate is overlaid on the driving coil for focusing or the driving coil for tracking, and attracted by the tracking magnet or the focusing magnet.

However, in the former, because the resilient member is a molding of rubber or resin, there arise such problems that it has poor temperature characteristics and ages quickly, and that it has a narrow range of linearity characteristics. In the latter, although such problems do not occur because the magnetic plate is placed in a gap between the driving coil for tracking and the tracking magnet or in a gap between the driving coil for focusing and the focusing magnet, such problems arise that the gap between the coil and the magnet is increased, which weakens the electromagnetic force and the sensitivity in the tracking or focusing direction is reduced, and that the objective lens driving structure must be of a larger size because of the increase of the gap, which causes a problem in reducing the size of the entire device.

SUMMARY OF THE INVENTION

Therefore, the present invention overcome the above-mentioned conventional problems and disadvantages, and provides an optical pickup which prevents a variation in maintenance of the neutral point of the objective lens, and has better vibration resistance.

The optical pickup according to the present invention comprises an objective lens for focusing a light beam on a disk-shaped recording medium, a holder for holding the objective lens, a journal for holding the holder so that it slides in the axial direction or in the focusing direction and rotates around the axis or in the tracking direction, and a fixed member for mounting the journal thereon, wherein at least a pair of magnets is installed in such a manner that each of their different poles is arranged opposite to the holder and the fixed member.

According to the present invention, an attraction acts between the magnet on the fixed member and the magnet on the holder, and an elastic restoring force also acts between them to hold the holder stably at the maximum point of flux. This restoring force holds the holder on the movable section, namely the objective lens, at the neutral point in the focusing and tracking directions.

Moreover, the magnetic attraction of the pair of magnets presses the holder against the journal to reduce play due to the clearance between the holder and the journal.

BRIEF DESCRIPTION OF THE DRAWINGS

The above-mentioned and other objects, features and advantages of this invention will become more apparent by reference to the following detailed description of the invention taken in conjunction with the accompanying drawings, wherein.

DETAILED DESCRIPTION OF THE PREFERRED EMBODIMENTS

Figure 1:
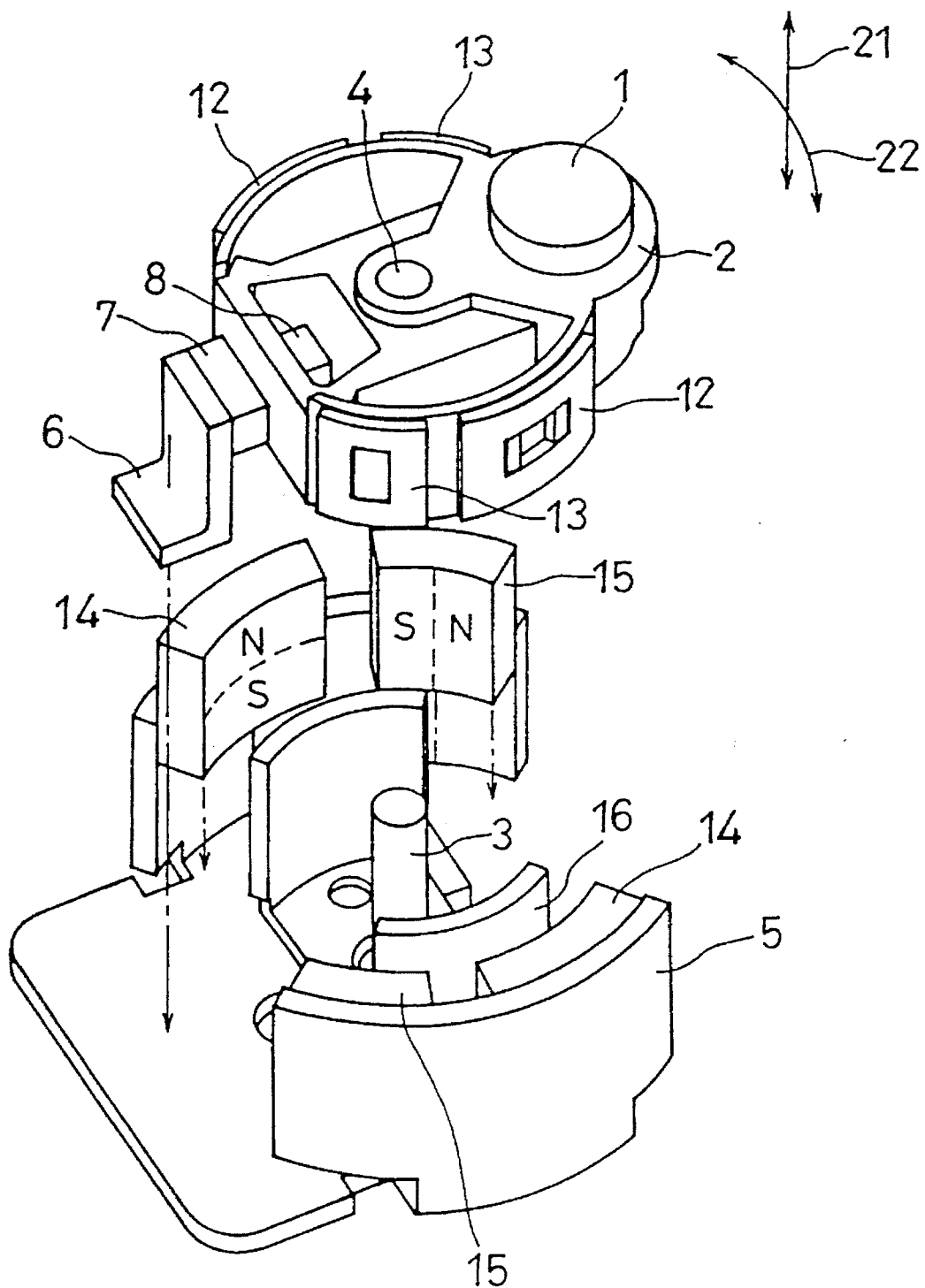
FIG. 1 is an exploded perspective view of the essential components of an optical pickup according to the present invention.
Figure 2:
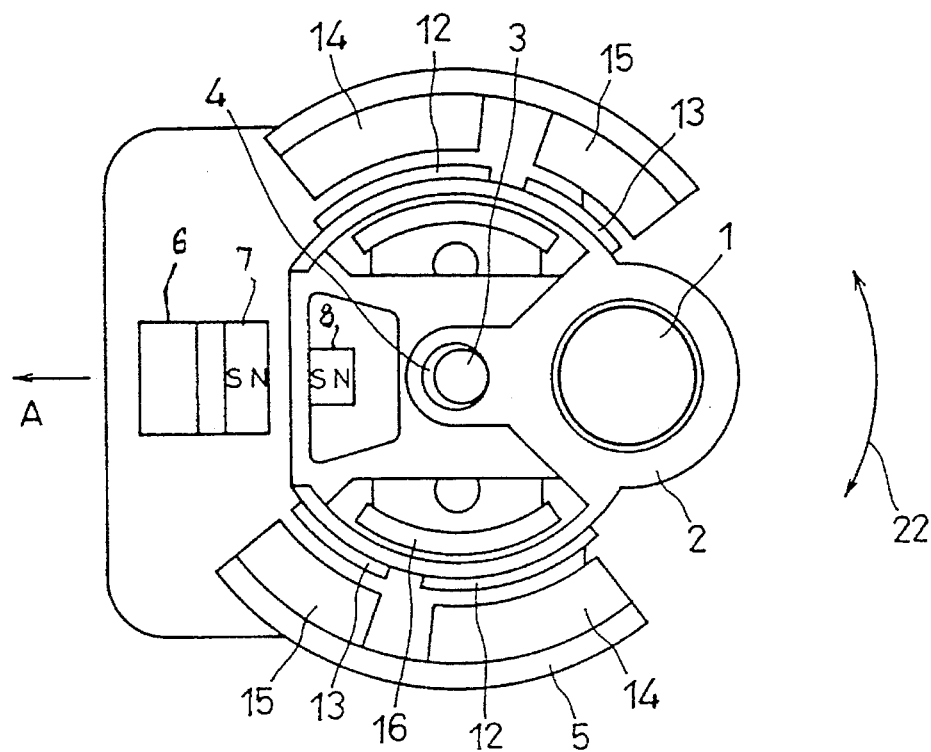
FIG. 2 is a plan view of the optical pickup according to the present invention.
Figure 3:
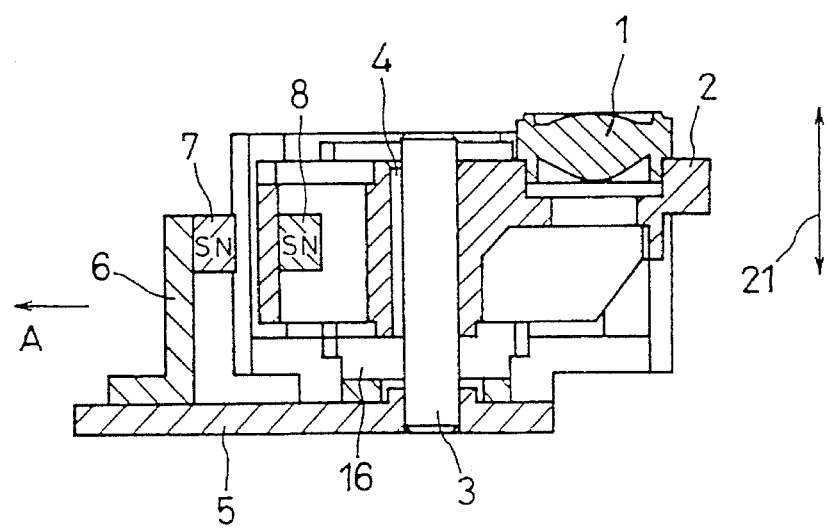
FIG. 3 is a side cross-sectional view of the optical pickup according to the present invention.

An embodiment of the present invention will now be described with reference to the drawings. FIG. 1 is an exploded perspective view of the essential components of an optical pickup according to the present invention, FIG. 2 is a plan view, and FIG. 3 is a side cross-sectional view. In these figures, the same arrangement as the prior art is designated by similar reference numerals, and detailed description of them are therefore omitted. The present invention features the fact that the magnetic piece 17 is eliminated, and a stationary magnet 7 and a movable magnet 8 are provided. That is, the stationary magnet 7 is secured on a support member 6 mounted on an outer core 5, and the movable magnet 8 is secured on holder 2. A center line of each of these magnets 7 and 8 is arranged to be positioned on a line from the center of the objective lens 1 and the center of the journal 3 when the objective lens 1 is positioned at the neutral point in the tracking direction 22. In addition, their opposite sides are magnetized in different poles, that is, N and S poles, so that a magnetic attraction acts between them.

Figure 4:
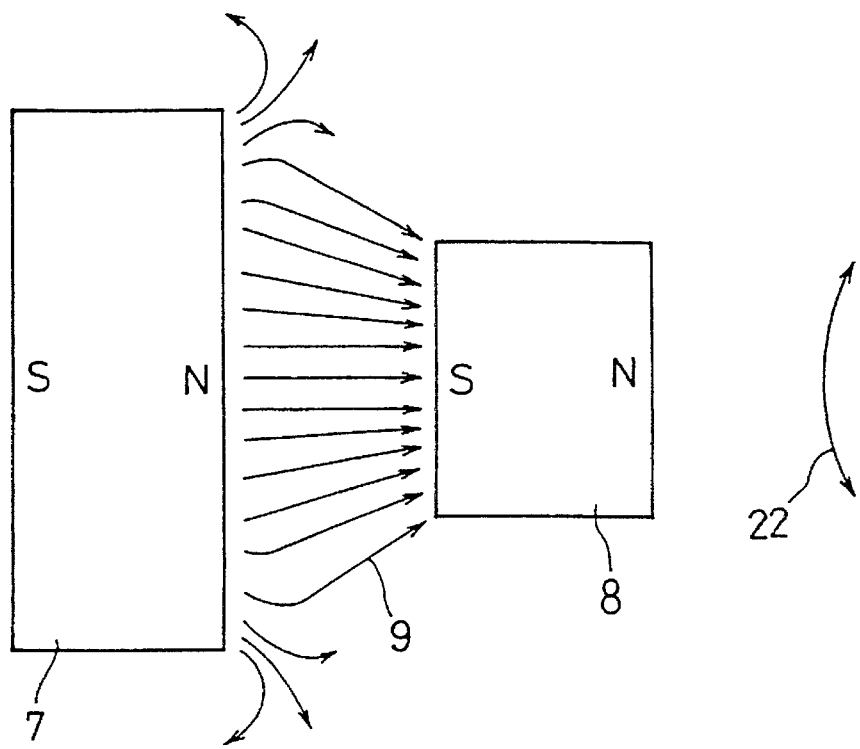
FIG. 4 is a plan view showing the generation of flux between the stationary and movable magnets in the optical pickup according to the present invention.
Figure 5:
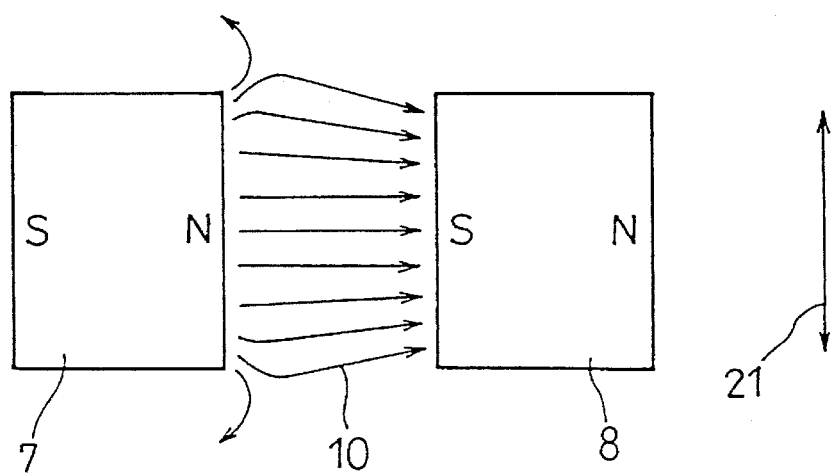
FIG. 5 is a side view showing the generation of flux between the stationary and movable magnets in the optical pickup according to the present invention.

FIGS. 4 and 5 show the magnetic attraction of the magnets 7 and 8, in a plan view and a side view, respectively. In FIG. 4, flux 9 is generated in a gap between the stationary magnet 7 and the movable magnet 8, with the flow shown in the FIG. 1. Because the intensity of the flux 9 is maximum at the center of the gap, when excitation is released from the driving coil for tracking 13, an elastic restoring force acts on the movable magnet 8 to hold it stably at the maximum point of the flux 9. The restoring force holds the holder 2 on which the movable magnet 8 is secured, likewise, the objective lens 1, at the neutral point in the tracking direction 22.

Similarly, the flux 10 also becomes maximum in the focusing direction 21, as shown in FIG. 5, at the center of the gap between the stationary magnet 7 and the movable magnet 8. When excitation is released from the driving coil for focusing 12, an elastic restoring force acts on the movable magnet 8 to hold it at the maximum point of the flux 10. The restoring force holds the objective lens 1 at the neutral point in the focusing direction 21.

Furthermore, as shown in FIGS. 2 and 3, the stationary magnet 7 and the movable magnet 8 cause the magnetic attraction to act on each other so that the holder 2 secured on the movable magnet 8 is attracted in the direction of arrow A by the clearance between the journal 3 and a bearing hole 4 provided in the holder 2. Therefore, because the holder 2 is pressed against the journal 3, even if there is a clearance between the bearing hole 4 and the journal 3, play of the holder 2 due to this clearance is significantly reduced.

The restoring force in the focusing direction 21 and the tracking direction 22 obtained by the magnetic attraction becomes a parameter which determines a resonant frequency $f_o$ and DC sensitivity of the movable section of the objective lens driving structure, that is, the holder 2. The restoring force and the pressing force pressing the holder 2 against the journal 3 can be optimized by specifically selecting the shape of the stationary magnet 7 and the movable magnet 8, such as their size and thickness.

Figure 6:
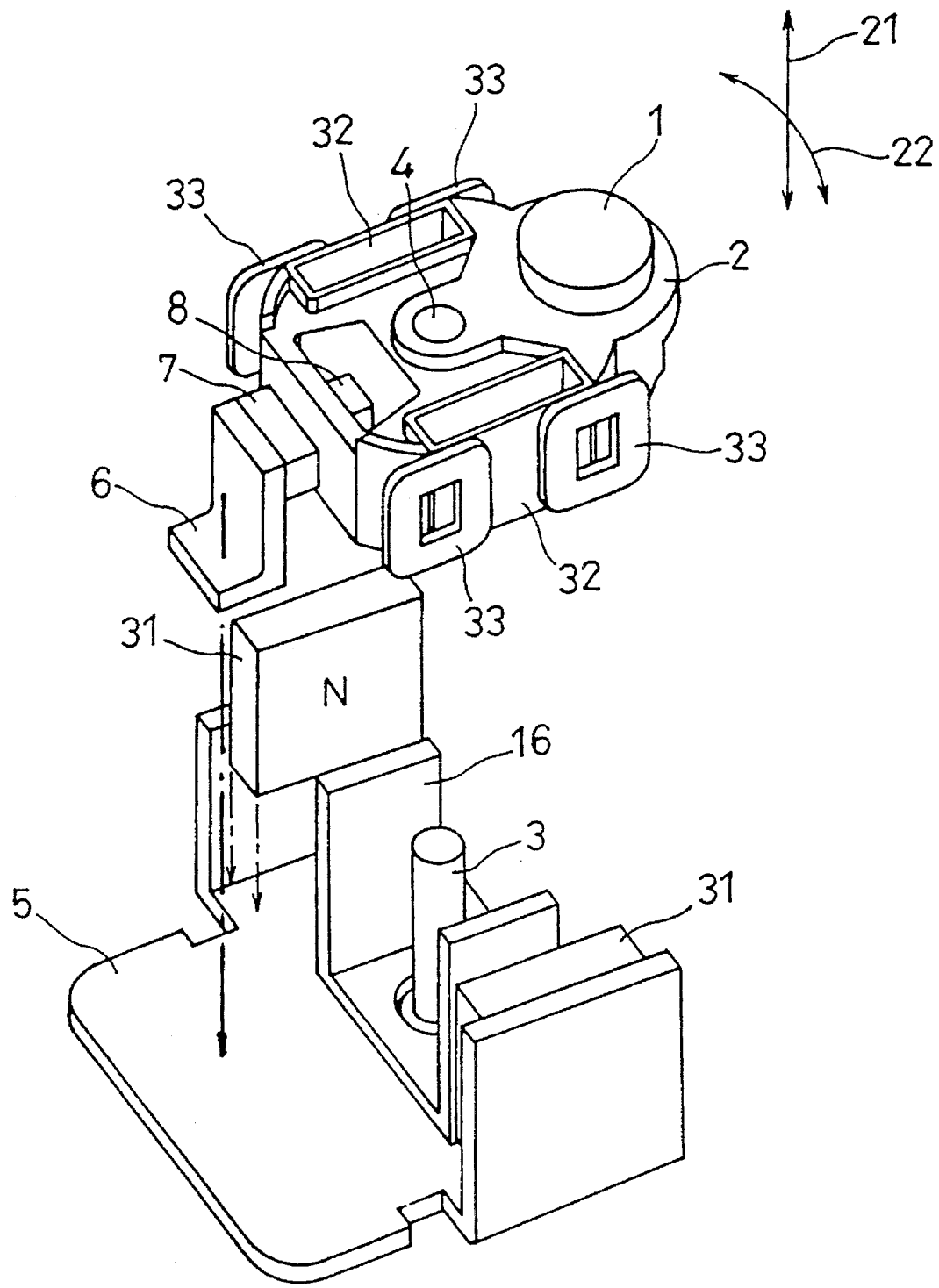
FIG. 6 is an exploded perspective view of the essential components of a second embodiment of the optical pickup according to the present invention.
Figure 7:
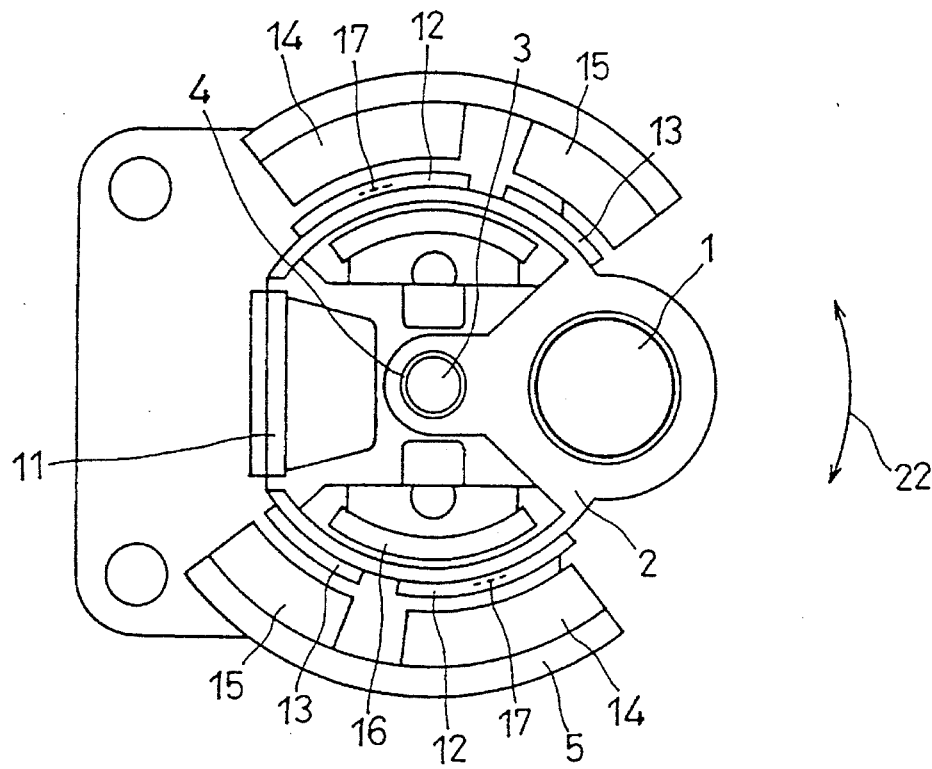
FIG. 7 is a plan view of a conventional optical pickup.
Figure 8:
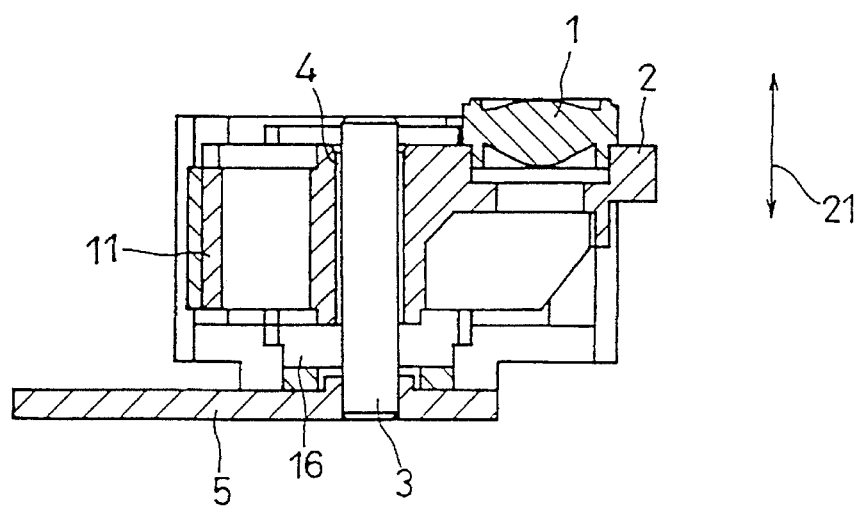
FIG. 8 is a side cross-sectional view of the conventional optical pickup.
Figure 9:
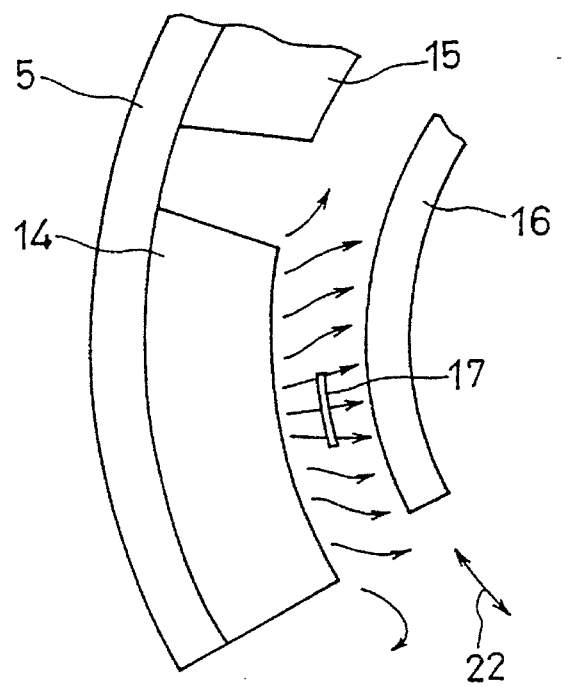
FIG. 9 is a plan view showing the generation of flux at a magnetic piece of the conventional optical pickup.
Figure 10:
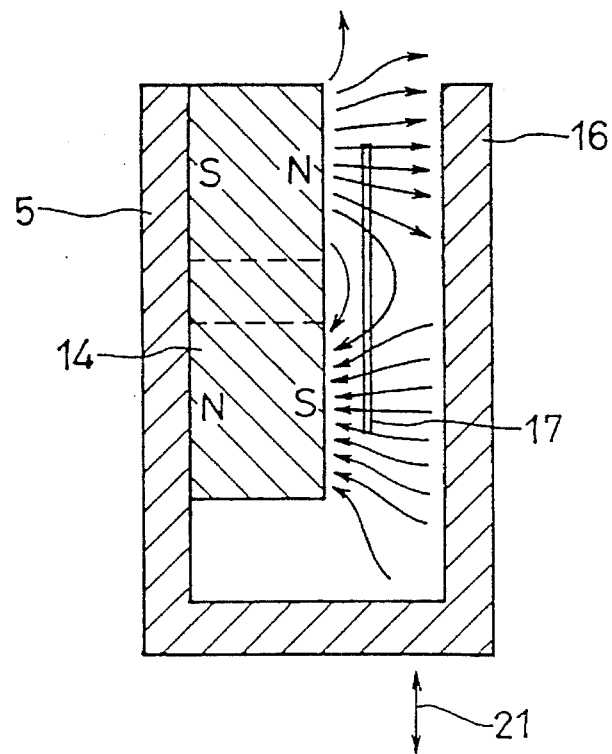
FIG. 10 is a side view showing the generation of flux at a magnetic piece of the conventional optical pickup.

FIG. 6 is an exploded perspective view showing a second embodiment of the present invention. The second embodiment features a fact that the magnet 31 secured on the outer core 5 is not polarized and magnetized. Even with such an arrangement, because the stationary magnet 7 and the movable magnet 8 are present, there arises no difficulty in maintaining the neutral points of the holder 2 in the focusing direction 21 and the tracking direction 22. Therefore, it can provide the same effects as in the first embodiment. Furthermore, because the magnet 31 is not required to be polarized and magnetized, the cost can be reduced. In addition, the magnet 31 is used in common for both focusing and tracking. 32 is a driving coil for focusing and 33 is a driving coil for tracking.

Furthermore, because the stationary magnet 7 is arranged to have a structure allowing the adjustment of its position in the focusing direction 21 or in the tracking direction 22, even when some variation occurs in the mounting accuracy of the movable magnet 8 and the holder 2, it becomes possible to adjust the position of the neutral point.

Although the stationary magnet 7 and the movable magnet 8 are paired in the above embodiments, it is a matter of course that the present invention is not limited to such arrangement, and multiple pairs or different numbers of these magnets can be employed as required.

As described above, according to the present invention, the holder can be held by an elastic restoring force from the magnetic attraction by providing at least a pair of magnets, the magnetic poles of which are placed opposite to the holder and the fixed member so that there is no necessity to polarize and magnetize the focusing and tracking magnets and the objective lens can be easily held at the neutral points in the focusing and tracking directions.

Furthermore, because the magnetic attraction for holding the holder with the elastic restoring force presses the holder against the journal, there is no need to use a resilient support member or a magnetic plate as in the prior art. Therefore, the optical pickup does not suffer from poor temperature characteristics or aging in its performance, and does not exhibit a deterioration of sensitivity in the focusing or tracking direction so that its vibration resistance can be improved while the size of the objective lens driving structure is reduced.

In addition, the movable magnet mounted on the holder can be used as a weight for balancing the weight of the holder so that the balance weight conventionally necessary can be eliminated, thus reducing the number of parts.

Although the present invention has been described in relation to particular embodiments thereof, many other variations and modifications and other uses will become apparent to those skilled in the art. It is preferred, therefore, that the present invention be limited not by the specification herein, but only by the appended claims.

What is claimed is:

1. An optical pick up, comprising:

a first member having a journal mounted thereon;

a holder having an objective lens mounted thereon, the objective lens having an optical axis;

the holder being mounted on the journal for both rotational movement about a central axis of the journal and axial movement along the central axis of the journal, the central axis of the journal being parallel to and spaced from the optical axis of the objective lens;

a first magnet mounted to the first member; and a second magnet mounted to the holder, the first and second magnets being arranged to bias the first member towards a fixed orientation with respect to the holder and cooperating to urge the holder against the journal along a radial direction of the journal.

2. The optical pickup of claim 1, further including focusing and tracking coils for selectively generating respective magnetic fields for moving the holder along the central axis of the journal and around the central axis of the journal, respectively.

3. The optical pick up of claim 2, further including a pair of permanent magnets which generate respective magnetic fields which cooperate with the selectively generated magnetic fields of the focusing and tracking coils to cause movement of the holder relative to the journal.

* * * * *